US012716453B2

(12) United States Patent
Harich

(10) Patent No.: US 12,716,453 B2
(45) Date of Patent: Aug. 25, 2026

(54) BEARING CAGE AND ROLLER BEARING INCLUDING THE CAGE

(71) Applicant: AKTIEBOLAGET SKF, Gothenburg (SE)

(72) Inventor: Roland Harich, Höchheim (DE)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 18/641,723

(22) Filed: Apr. 22, 2024

(65) Prior Publication Data

US 2024/0360873 A1 Oct. 31, 2024

(30) Foreign Application Priority Data

Apr. 28, 2023 (DE) ........................ 102023203976.1

(51) Int. Cl.
*F16C 33/46* (2006.01)
*F16C 33/54* (2006.01)

(52) U.S. Cl.
CPC ........ *F16C 33/4676* (2013.01); *F16C 33/541* (2013.01); *F16C 33/543* (2013.01)

(58) Field of Classification Search
CPC ................ F16C 33/4629; F16C 33/467; F16C 33/4676; F16C 33/54; F16C 33/541; F16C 33/542; F16C 33/543
See application file for complete search history.

(56) References Cited

U.S. PATENT DOCUMENTS

| | | | | |
|---|---|---|---|---|
| 3,940,193 | A | 2/1976 | Molloy | |
| 6,213,648 | B1 * | 4/2001 | Weidinger | B21H 7/187 384/575 |
| 7,789,570 | B2 * | 9/2010 | Tsujimoto | F16C 33/4635 384/470 |
| 10,683,896 | B2 * | 6/2020 | Harich | F16C 33/467 |
| 2006/0045403 | A1 * | 3/2006 | Tsujimoto | F16C 19/364 384/572 |
| 2009/0016664 | A1 * | 1/2009 | Tsujimoto | F16C 33/36 384/576 |
| 2010/0322547 | A1 * | 12/2010 | Matsushita | F16C 19/386 384/548 |

(Continued)

FOREIGN PATENT DOCUMENTS

| | | |
|---|---|---|
| DE | 37708 | 6/1960 |
| DE | 102008060700 A1 | 6/2010 |

(Continued)

OTHER PUBLICATIONS

Office Action from the German Patent Office dispatched Jan. 15, 2024 in related German application No. 10 2023 203 976.1, and translation thereof.

*Primary Examiner* — Alan B Waits
(74) *Attorney, Agent, or Firm* — J-TEK LAW PLLC; Scott T. Wakeman; Mark A. Ussai

(57) ABSTRACT

A bearing cage for a roller bearing includes first and second axially spaced ring elements and a plurality of bridges extending therebetween and defining a plurality of pockets each configured to receive a roller element. Each of the bridges has first and second circumferential side faces that form contact surfaces for the rollers. Furthermore, each of the contact faces has an embossing depth greater than 50% of the radial thickness in a radially outer direction.

14 Claims, 2 Drawing Sheets

(56) References Cited

U.S. PATENT DOCUMENTS

| | | | | |
|---|---|---|---|---|
| 2013/0089285 | A1* | 4/2013 | Shimizu | F16C 33/58<br>384/565 |
| 2013/0098285 | A1* | 4/2013 | Takano | B63H 1/28<br>114/67 A |
| 2020/0340531 | A1* | 10/2020 | Ziegelhoefer | F16C 33/4605 |

FOREIGN PATENT DOCUMENTS

| | | | |
|---|---|---|---|
| DE | 102013215209 | A1 | 5/2014 |
| DE | 102013215972 | A1 | 2/2015 |
| JP | 2002115723 | A | 4/2002 |

* cited by examiner

BEARING CAGE AND ROLLER BEARING INCLUDING THE CAGE

CROSS-REFERENCE

This application claims priority to German patent application no. 10 2023 203 976.1 filed on Apr. 28, 2023, the contents of which are fully incorporated herein by reference.

TECHNOLOGICAL FIELD

The present disclosure is directed to bearing cage for a roller bearing having improved pocket side walls and to a roller bearing having such a bearing cage.

BACKGROUND

Bearing cages are normally used in roller bearings to guide and mount the roller bodies of the roller bearing, preferably at even spacing. Such bearing cages may be made of metal or plastic, wherein in particular in the case of metal, the bearing cage is often produced by punching and subsequent embossing from a metal sheet. The cage itself usually includes two ring elements which are axially offset to one another and connected together via bridges so that pockets for receiving the roller bodies are formed between the ring elements and the bridges. This however also means that the roller bodies received in the pockets and the elements of the cage that define the pockets interact with one another so that the bearing cage is exposed to high loads. In this method of production of the bearing cage, it is usual for the faces of the bridges, on which the running face of the roller received in the pocket can bear, are formed by embossing. Usually, a region of the bridge is embossed from a radially inner edge towards a radially outer edge.

It has been found that, in particular for rail vehicle applications, the structural loading on the cage is particularly great. These loads in particular may lead to breakage of the cage. In order to reduce the risk of the cage breaking under load during use, a known solution is to increase the metal thickness and/or reduce the number of rollers. This however leads to a greater weight of the cage.

SUMMARY

It is therefore an aspect of the present disclosure to provide a bearing cage for a roller bearing, in particular for a tapered roller bearing, which has an improved structural load-bearing capacity.

A bearing cage for a roller bearing is described below. The rollers may for example be cylindrical rollers, tapered rollers, needle rollers or similar. The bearing cage has a first and a second ring element which each extend in the circumferential direction of the bearing cage. The bearing cage also has multiple bridges extending substantially in the axial direction of the bearing cage, wherein the bridges are connected to the first and second ring elements such that pockets for receiving a roller body are formed between the bridges and the ring elements. The bridges have a thickness in the radial direction and a first and a second side face in the circumferential direction, which face is configured at least partly as a contact face for the roller body received in the pocket. The contact face is embossed.

Surprisingly, the inventor has found that the structural weakening of the bearing cage from the prior art is related to a theoretical contact line of the roller. The theoretical contact line is the region in which the roller and the contact face make theoretical contact, i.e. without the influence of forces acting on the bearing. Because of the forces acting in and/or on the bearing, an actual contact line of the roller on the contact face during use may lie at a position that deviates from the theoretical contact line. In cages of the prior art, the theoretical contact line lies approximately in the radial middle of the embossed support surface, i.e. at approximately half the embossing depth.

As the inventor has surprisingly found, the structural load-bearing capacity of the bearing cage is greater if the theoretical contact line is shifted further towards the radial outside of the bridge. Therefore a bearing cage is provided in which an embossing depth is greater than 50% of the bridge thickness measured from the radially inner side of the bridge. That is, the embossing is performed from the radially inner side of the bridge in the direction of the radially outer side of the bridge. Preferably, the embossing depth is between 60% and 85% of the bridge thickness. This allows the theoretical contact line to be shifted further in the radial direction towards the middle of the bridge. Advantageously, the theoretical contact line between the roller body received in the pocket and the embossed contact faces lies at between 30% and 70% of the bridge thickness, preferably between 40% and 60% of the bridge thickness.

A greater embossing depth allows the structural load-bearing capacity of the cage to be significantly increased for the same material thickness of the bridge. This means that for the same material thickness, a more robust bearing cage can be achieved.

Embossing is a pressure forming method in which a material is deformed by pressing and can thus achieve a desired shape. Work-hardening of the embossed face can advantageously also occur during embossing. In particular, an embossed contact face can have a surface which is suitable for coming into contact with a rolling body without excessively damaging a running face of the rolling body and/or a lubricant layer. In the case of cages made from metal, for example, the pockets can first of all be punched, punching severing the material similarly to cutting, as a result of which the obtained surfaces are relatively rough and/or uneven. Subsequently, the pockets can be formed by embossing at least in the region of the contact faces, as a result of which surface irregularities as a result of the pressure forming which is the embossing can be smoothed.

The bearing cage itself may be made integrally, e.g. from a metal sheet, but it is however also possible for the bearing cage to be composed of individual elements.

According to a preferred embodiment, at least one of the embossed contact faces runs at a predefined angle to the radial direction. Preferably, the contact face embossed on the first side face runs at a first predefined angle to the radial direction, and the contact face embossed on the second side face runs at a second predefined angle to the radial direction. Furthermore, the first and the second predefined angles may differ in their orientation relative to the radial direction and be equal to one another in amount.

The first predefined angle and/or the second predefined angle may be selected such that the theoretical contact line between a roller received in the pocket and the bearing cage lies radially in the middle of the side face as far as possible. In particular, on embossing, both contact faces of a bridge may be embossed simultaneously. Alternatively, during embossing, both contact faces of a pocket may be embossed simultaneously. During embossing, a tool may be used which has two oblique embossing faces which enclose an angle between them, wherein the angle is called the embossing angle and the tool is placed on the bridge from the inside in the radial direction. Preferably, the predefined angle of the embossed contact face is determined by the embossing angle. Thus by changing the embossing angle, the angle at which the embossed contact face runs relative to the radial direction can easily be varied.

According to a preferred embodiment, the contact faces embossed onto the first and second side faces enclose an acute angle between them in the radial direction. As already stated, in particular the angle which the contact faces embossed on the first and second side faces enclose between them in the radial direction, can be determined via an embossing angle. In particular, a greater embossing angle may lead to a greater embossing depth. For example, an approximately 10° larger embossing angle and the associated increase in embossing depth, with otherwise the same design of bearing cage, can lead to an up to 8% higher structural load-bearing capacity. In order to achieve a comparable structural load-bearing capacity simply by increasing the material thickness, it may be necessary to increase the material thickness by around 25%.

According to another embodiment, a bearing cage for a roller bearing includes a first ring element axially spaced from a second ring element, and a plurality of bridges extending from the first ring element to the second ring element and defining with the first ring element and the second ring element a plurality of pockets each configured to receive a roller element. Each of the bridges has a radially inner surface, a radially outer surface, a radial thickness from the radially inner surface to the radial outer surface, a first circumferential side and a second circumferential side. The first circumferential side has radially inner surface portion lying in a first plane and a radially outer circumferential surface lying in a second plane, the second plane intersecting the first plane along an first axial line. The second circumferential side has radially inner surface portion lying in a third plane and a radially outer circumferential surface lying in a fourth plane, the third plane intersecting the fourth plane along a second axial line. Furthermore, the first axial line and the second axial line are each located closer to the radially outer surface than to the radially inner surface. Preferably, a radial width of the first plane is between 60% and 85% of the radial thickness.

A further advantage of the bearing cage according to the disclosure is that because of the above-described design, the structural load-bearing capacity of the bearing cage can be increased such that it is even possible to reduce the thickness of the metal sheet. This in turn leads to a reduction in material consumption and hence a cost reduction.

A further aspect concerns a roller bearing, in particular a tapered roller bearing, with at least an inner ring, an outer ring and roll-like roller bodies arranged in between, wherein the roller bodies are received in a bearing cage as described above.

It is furthermore advantageous if the roll-like roller bodies have a running face via which they roll on the inner and outer rings, are at least partially guided by the bridge of the bearing cage and have a first and a second end face, wherein the first end face is assigned to the first ring element and the second end face to the second ring element of the bearing cage.

Further advantages and advantageous embodiments are given in the description, the drawings and the claims. In particular, the feature combinations indicated in the description and drawings are purely exemplary so that the features may also be present individually or in other combinations.

Aspects of the invention will be described in more detail below with reference to exemplary embodiments illustrated in the drawings. The exemplary embodiments and combinations shown therein are purely exemplary and do not establish the scope of protection of the invention. This is defined purely by the appended claims.

DETAILED DESCRIPTION

The same elements or those with equivalent function are identified below with the same reference signs.

Figure 1:
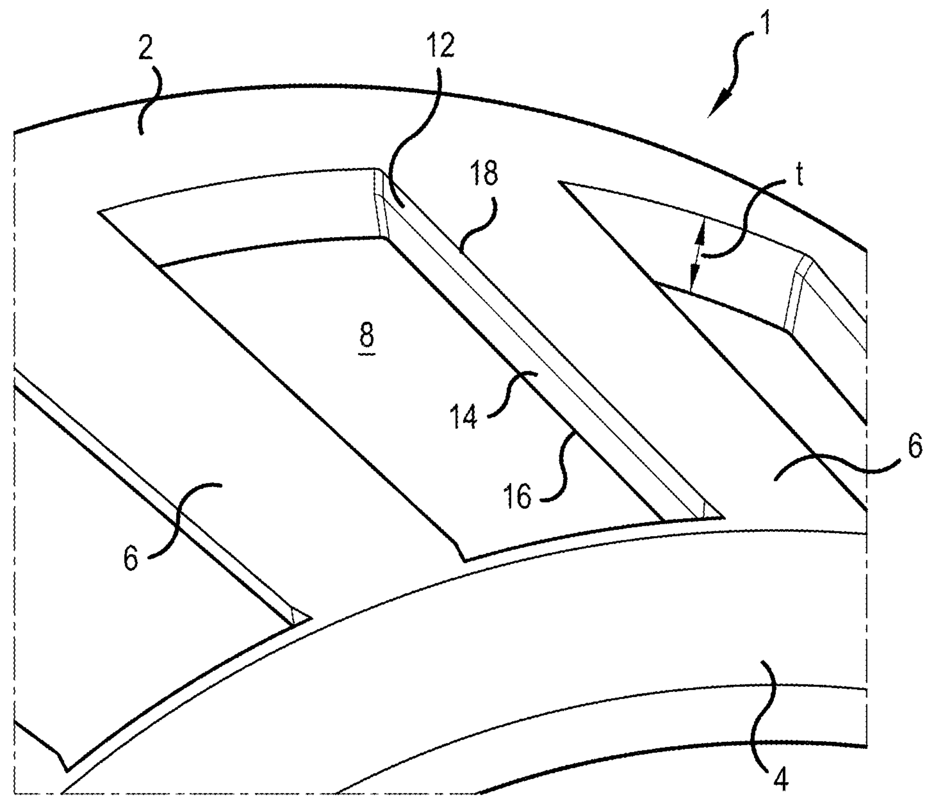
FIG. 1 is a schematic perspective view of part of a bearing cage according to an embodiment of the present disclosure.
Figure 2:
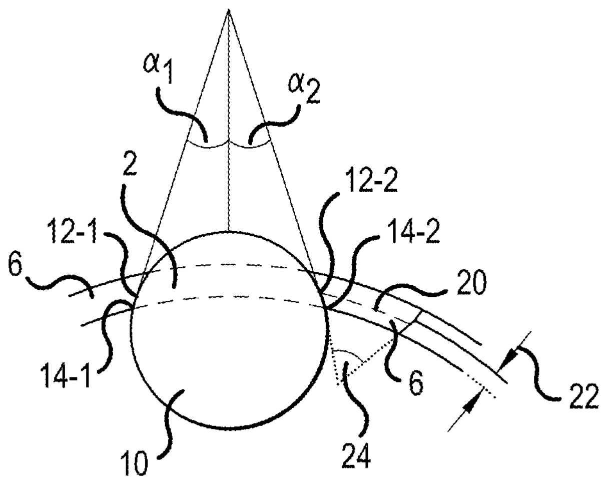
FIG. 2 is a schematic sectional view through a part of the bearing cage of FIG. 1.

FIG. 1 shows a view of a part of a bearing cage 1 of a roller bearing with a first ring element 2 and a second ring element 4, which are connected together by means of multiple bridges 6. Thus between the first ring element 2, the second ring element 4 and the bridges 6, pockets 8 are formed which may receive roll-like rolling elements such as cylindrical rollers, tapered rollers, needle rollers or similar. The holding of a roller body 10 is illustrated in FIG. 2, which also shows the ring element 2 and the bridges 6 in sectional view. FIG. 2 furthermore shows that the roller body 10 is received in the pocket 8. The bearing cage itself is usually made of a sheet metal or plastic.

Furthermore, the bearing cage 1 has a sheet metal thickness t, as shown in the view of FIG. 1. Because of the novel design of the bearing cage 1 described below, this sheet metal thickness t may be reduced without loss of structural load-bearing capacity of the bearing cage 1.

Each of the bridges 6 has a first and a second side face 12 facing in opposite circumferential directions, wherein the side faces are formed by embossing so that they are at least partially configured as contact faces 14 for the roller body 10 received in the pocket 8. The contact face 14 is formed in a region of the bridge 6 which extends from a radially inner edge 16 towards a radially outer edge 18.

The contact faces 14 are embossed such that the contact face 14-1 embossed onto the first side face 12-1 runs at a first predefined angle $\alpha_1$ to the radial direction, and the contact face 14-2 embossed onto the second side face 12-2 runs at a second predefined angle $\alpha_2$ to the radial direction. In the embodiment shown, the first and second predefined angles $\alpha_1$, $\alpha_2$ differ in their orientation to the radial direction but are equal in amount. Alternatively, the first and second predefined angles $\alpha_1$, $\alpha_2$ may also differ in amount.

The first and second predefined angles $\alpha_1$, $\alpha_2$ are selected such that a theoretical contact line 20 between a roller body 10 received in the pocket and the bearing cage 1 lies as far as possible in the radial middle of the side face 12. Preferably, the theoretical contact line 20 lies at between 30% and 70% of the bridge thickness t. Advantageously, the theoretical contact line 20 may lie at between 40% and 60% of the bridge thickness t. The predefined angle $\alpha_1$, $\alpha_2$ of the embossed contact faces 14 is related to an embossing angle 24 of the bridges and is therefore also determined by this embossing angle 24.

The predefined angles $\alpha_1$, $\alpha_2$ are selected such that the contact faces 14-1, 14-2 embossed on the first and second side faces 12-1, 12-2 enclose an acute angle between them in the radial direction.

In particular, a greater embossing angle may lead to a greater embossing depth 22. A greater embossing depth 22 has the advantage that the theoretical contact line 20 between the roller body 10 and the bearing cage 1 can be shifted further towards the radially outer edge 18 of the bridge 6. An embossing depth 22 which is greater than 50% of the bridge thickness t is advantageous. Preferably, the embossing depth is between 60% and 85% of the bridge thickness t.

Figure 3:
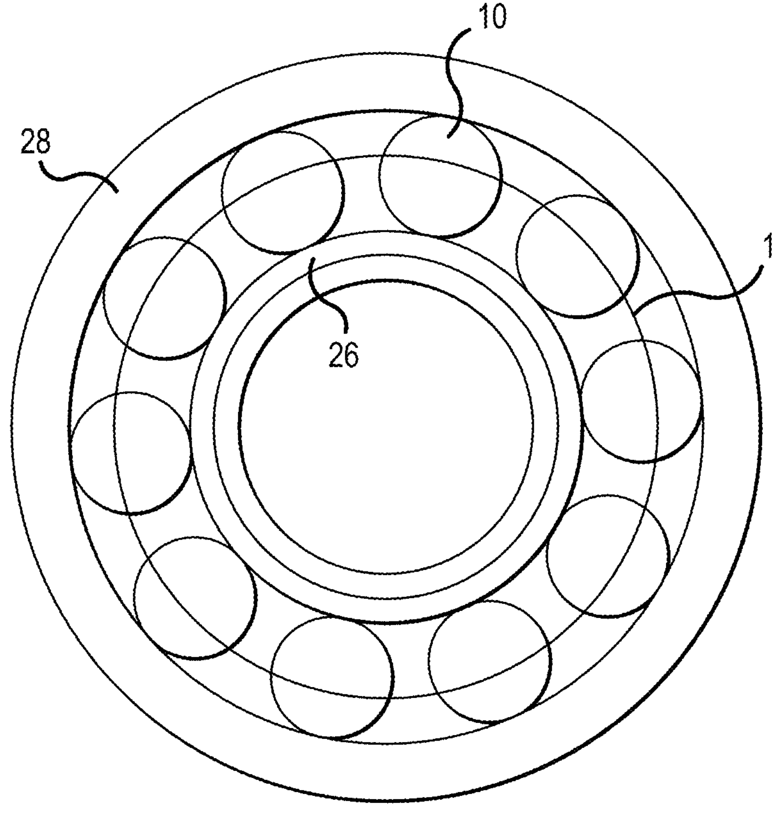
FIG. 3 is a schematic view of a bearing including the cage of FIG. 1.

FIG. 3 illustrates a bearing having an inner ring 26, an outer ring 28, the rollers 10 and a cage 1 as described above.

In conclusion, with the present bearing cage design, a bearing cage 1 can be provided in which the structural load-bearing capacity is increased such that it is even possible to reduce the metal thickness t of the cage 1 for the same load values in comparison with a standard design.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved bearing cages.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

LIST OF REFERENCE SIGNS

1 Bearing cage
2 First ring element
4 Second ring element
6 Bridge
8 Pocket
10 Roller
12 Side face
14 Contact face
16, 18 Edge
20 Theoretical contact line
22 Embossing depth
24 Embossing angle
26 Inner ring
28 Outer ring
t Bridge thickness
$\alpha_1$, $\alpha_2$ Angle

What is claimed is:

1. A bearing cage for a roller bearing comprising:
a first ring element axially spaced from a second ring element, and
a plurality of bridges extending from the first ring element to the second ring element and defining with the first ring element and the second ring element a plurality of pockets each configured to receive a roller element,
wherein each of the bridges has a radial thickness,
wherein each of the bridges has a first circumferential side face and a second circumferential side face,
wherein at least a portion of each first circumferential side face is configured to form a first contact surface for one of the roller elements and at least a portion of each second circumferential side face is configured to form a second contact surface for the one of the roller elements,
wherein each of the first contact surfaces and the second contact surfaces has an embossing depth greater than 50% of the radial thickness,
wherein the first ring element, second ring element and plurality of bridges comprise sheet metal.

2. The bearing cage according to claim 1,
wherein each of the first contact surfaces extends at a predefined angle to a radial direction.

3. The bearing cage according to claim 1,
wherein each of the first contact surfaces extend at a first predefined angle to the radial direction, and each of the second contact surfaces extend at a second predefined angle to the radial direction.

4. The bearing cage according to claim 3,
wherein the first and the second predefined angles are equal in amount.

5. The bearing cage according to claim 4,
wherein each mutually facing pair of the first and second contact surfaces enclose an acute angle in the radial direction.

6. The bearing cage according to claim 1,
wherein the embossing depth is determined by an embossing angle.

7. A roller bearing comprising:
an inner ring,
an outer ring, and
a bearing cage according to claim 1 between the inner ring and the outer ring,
wherein one of the roller elements is located in each of the plurality of pockets.

8. The roller bearing according to claim 7,
wherein a theoretical contact line between one of the roller elements and the first and second contact surfaces of one of the pockets lies between 30% and 70% of the radial thickness.

9. The bearing cage according to claim 1,
wherein the embossing depth is between 60% and 85% of the radial thickness.

10. A bearing cage for a roller bearing comprising:
a first ring element axially spaced from a second ring element, and
a plurality of bridges extending from the first ring element to the second ring element and defining with the first ring element and the second ring element a plurality of pockets each configured to receive a roller element,
wherein each of the bridges has a radial thickness,
wherein each of the bridges has a first circumferential side face and a second circumferential side face,
wherein at least a portion of each first circumferential side face is configured to form a first contact surface for one of the roller elements and at least a portion of each second circumferential side face is configured to form a second contact surface for the one of the roller elements, wherein each of the first contact surfaces and the second contact surfaces has an embossing depth between 60% and 85% of the radial thickness.

11. A roller bearing comprising:

an inner ring, an outer ring, and a bearing cage according to claim 10 between the inner ring and the outer ring, wherein one of the roller elements is located in each of the plurality of pockets.

12. A bearing cage for a roller bearing comprising:

a first ring element axially spaced from a second ring element, and a plurality of bridges extending from the first ring element to the second ring element and defining with the first ring element and the second ring element a plurality of pockets each configured to receive a roller element, wherein each of the bridges has a radially inner surface, a radially outer surface and a radial thickness from the radially inner surface to the radial outer surface, wherein each of the bridges has a first circumferential side and a second circumferential side, wherein the first circumferential side of each of the bridges has a radially inner surface portion lying in a first plane and a radially outer circumferential surface lying in a second plane, the second plane intersecting the first plane along an first axial line, wherein the second circumferential side of each of the bridges has a radially inner surface portion lying in a third plane and a radially outer circumferential surface lying in a fourth plane, the third plane intersecting the fourth plane along a second axial line, wherein the first axial line and the second axial line are each located closer to the radially outer surface than to the radially inner surface, and wherein a radial width of the radially inner surface portion of the first circumferential side of each of the bridges is between 60% and 85% of the radial thickness.

13. The bearing cage according to claim 12, wherein the radially inner surface of the first circumferential side and the radial inner surface of the second circumferential side are embossed.

14. A roller bearing comprising:

an inner ring, an outer ring, and a bearing cage according to claim 12 between the inner ring and the outer ring, wherein one of the roller elements is located in each of the plurality of pockets.

* * * * *